United States Patent [19]

McKinney

[11] 4,402,913

[45] Sep. 6, 1983

[54] APPARATUS FOR THE FLUIDIZED CATALYTIC CRACKING OF HYDROCARBON FEEDSTOCKS

[75] Inventor: Claude O. McKinney, Munster, Ind.

[73] Assignee: Standard Oil Company (Indiana), Chicago, Ill.

[21] Appl. No.: 306,961

[22] Filed: Sep. 30, 1981

[51] Int. Cl.³ ............................................. F27B 15/08
[52] U.S. Cl. ..................................... 422/110; 208/74; 208/78; 422/112; 422/144; 422/145
[58] Field of Search .............. 422/107, 110, 112, 141, 422/144, 145; 208/72–74, 78–80, 67

[56] References Cited

U.S. PATENT DOCUMENTS

| | | | |
|---|---|---|---|
| 2,650,155 | 8/1953 | Medlin | 422/144 |
| 2,689,210 | 9/1954 | Leffer | 422/144 X |
| 3,011,969 | 12/1961 | Mader | 422/112 X |
| 3,492,221 | 1/1970 | Pfeiffer | 422/144 X |
| 3,849,291 | 11/1974 | Owen | 208/78 |
| 3,894,931 | 7/1975 | Nace et al. | 208/78 X |
| 3,894,935 | 7/1975 | Owen | 208/78 |
| 3,928,172 | 12/1975 | Davis, Jr. et al. | 208/77 |
| 4,067,798 | 1/1978 | Hauschildt et al. | 208/74 X |
| 4,297,203 | 10/1981 | Ford et al. | 208/74 |
| 4,310,489 | 1/1982 | Fahrig et al. 422 | 110/ |

*Primary Examiner*—Richard L. Chiesa
*Attorney, Agent, or Firm*—Lansing M. Hinrichs; William T. McClain; William H. Magidson

[57] ABSTRACT

An apparatus for the fluidized catalytic cracking of hydrocarbon feedstocks. The apparatus accomplishes the separate and simultaneous contacting of two fluid streams, at least one of which is a hydrocarbon feedstock, with cracking catalyst followed by the removal of the vaporous products therefrom with minimal commingling. The apparatus comprises multiple riser reactors, a partition positioned in the disengaging vessel separating the dilute phase into two regions, and a control system for controlling the direction and volume of flow between the two dilute phase regions at a desired point. The apparatus is particularly suitable for use in the simultaneous fluidized catalytic cracking of dissimilar hydrocarbon feedstocks with minimal commingling of the products therefrom.

5 Claims, 9 Drawing Figures

FIG. 1 (THE DAVIS APPARATUS)

FIG. 2 (THE FORD APPARATUS)

FIG. 3 (THE FAHRIG APPARATUS)

APPARATUS FOR THE FLUIDIZED CATALYTIC CRACKING OF HYDROCARBON FEEDSTOCKS

FIELD OF THE INVENTION

This invention relates to a an apparatus for the fluidized catalytic cracking of hydrocarbon feedstocks. The apparatus is one in which two fluid streams, at least one of which is a hydrocarbon feedstock, are separately and simultaneously contacted with a cracking catalyst and then are removed with a controlled amount of commingling. The apparatus is suitable for use in effecting this process and is particularly suitable for use in the simultaneous fluidized catalytic cracking of dissimilar hydrocarbon feedstocks with minimal commingling of the products therefrom.

BACKGROUND OF THE INVENTION

1. Fluidized Catalytic Cracking

Crude petroleum is a complex mixture of thousands of different chemical compounds, ranging from methane, which is a dissolved gas, to compounds which are solids at room temperature. These various compounds are composed mostly of hydrogen and carbon, and are accordingly called hydrocarbons. Crude also contains small amounts of sulfur, nitrogen, oxygen, and certain metals. These elements are generally chemically combined with hydrogen and carbon.

When crude petroleum is processed into useful products in an oil refinery, one of the first steps is to separate the crude into various fractions based on boiling point. These fractions, along with their boiling point ranges and respective volume percentages in a typical West Texas crude, are given in Table I.

TABLE I

| Crude Petroleum Fractions | | |
|---|---|---|
| Fraction | Boiling Point Range, °F. | Volume Percent |
| Gas | Less than 80 | 2 |
| Light Naphtha | 80–200 | 11 |
| Heavy Naphtha | 200–350 | 14 |
| Distillate | 350–650 | 17 |
| Gas Oil | 650–1000 | 39 |
| Residual | Greater than 1000 | 17 |

The petroleum product for which there is the greatest demand is gasoline, which is itself a complex mixture of hydrocarbons. To burn efficiently in internal combustion engines, gasoline must contain hydrocarbons which have boiling points in the range of about 80° to 400° F. and which also have the right structure to yield a relatively high octane number. The octane number scale is a measure of the ability of a gasoline to resist premature burning or, as it is often called, engine knock. The gasolines sold on the market today have octane numbers in the range of about 85 to 95, on the scale $(R+M)/2$ where R is the research octane number and M is the motor octane number.

From Table I it can be seen that the oil refiner could use the light naphtha and heavy naphtha fractions to make gasoline since these fractions boil in the 80° to 400° F. range. However, the octane number of these fractions is only about 70, which is too low to be used in today's automobiles. Furthermore, these two fractions make up only about 25 percent of the crude, an amount far below the demand for gasoline relative to other petroleum products.

In response to these needs, the oil refining industry has developed processes to convert non-gasoline-boiling fractions into fractions which boil in the gasoline range and which also have relatively high octane numbers. It has also been discovered that the addition of small amounts of certain antiknock agents, such as tetraethyl lead, substantially increases the octane number of a fraction. For example, the addition of only 3 milliliters of tetraethyl lead solution to a gallon of light naphtha raises the octane number from about 70 to about 85.

The major process for converting non-gasoline-boiling fractions into gasoline-boiling fractions is the fluidized catalytic cracking (FCC) process. In the FCC process, a heavy hydrocarbon fraction, such as a gas oil or a residual, is contacted with hot, finely divided, solid catalyst particles for a period of time sufficient to crack the heavy hydrocarbons into lighter molecular weight products of the kind suitable for gasoline. During the cracking process, a small amount of solid coke is formed on the surface of the catalyst particles. Since the coke reduces the catalytic activity of the particles, it must eventually be removed.

Typically, sufficient contacting time occurs as the hydrocarbons and catalyst flow together up an elongated vertical tube, often called a riser reactor. The riser reactor empties into a large disengaging vessel where the cracked hydrocarbon vapors are separated from the solid catalyst particles. The hydrocarbons are withdrawn to product recovery systems through cyclone separators located within the vessel. The particular configuration of the riser reactor and cyclone separators within the disengaging vessel varies widely in FCC units currently in operation in the U.S.

The coke-deposited catalyst drops by gravity to fill the lower portion of the disengaging vessel where it is stripped with an inert gas such as steam to remove entrained hydrocarbons. The catalyst is then sent to a regenerator vessel for removal of the solid coke which built up on the catalyst during the cracking reaction. In the regenerator, the coke is removed by passing an oxygen-containing gas such as air through the catalyst bed so that the coke burns off as carbon dioxide and carbon monoxide. The regenerated catalyst is then reintroduced into the riser reactor.

When a gas oil is catalytically cracked, the product mix typically contains about 50 volume percent of a product boiling in the gasoline range. This product typically has an octane number in the range of about 80 to 90. With the addition of tetraethyl lead, a high octane product is obtained which is then blended with other gasoline-boiling fractions to produce a gasoline of the desired octane number.

During the past decade and a half, there has been increased concern about the environmental effects of burning gasoline in internal combustion engines. While the major products of the burning are water and carbon dioxide, which are harmless, the products unfortunately include carbon monoxide, sulfur oxides, nitrogen oxides, unburned hydrocarbons, and lead, all of which are air pollutants. Beginning in 1974, most of the automobiles sold in the United States have been equipped with exhaust gas catalytic converters to reduce emissions of carbon monoxide, nitrogen oxides, and unburned hydrocarbons. Since lead poisons the catalyst used in these converters, the addition of lead to gasolines for use in converter-equipped automobiles has been halted.

Since lead addition had been an easy way to increase octane, the oil refining industry is now faced with the problem of developing new processes to produce fractions with intrinsically high octane numbers. The oil refining industry is also faced with the problem of reducing the amount of sulfur in gasoline so as to reduce the emissions of sulfur oxides.

2. Recracking

It has been taught that the quality of the product mix from an FCC unit can be improved if at least one of the products is recracked. One form of recracking is to simply recycle at least one of the cracked products back to the riser reactor to be recracked. This method has limited utility since the recycled product is subjected a second time to the same conditions in the riser reactor.

A second form of recracking is to crack an already cracked product in a second riser reactor. In this form of recracking, the reaction conditions in the second riser can be set, as desired, independently of the conditions in the first riser. Processes of this type are disclosed in Davis, U.S. Pat. No. 3,928,172 and in Hauschildt, U.S. Pat. No. 4,067,798. The Hauschildt patent is commonly assigned and both patents are incorporated by reference.

Davis teaches that the quality and volatility of a refinery gasoline pool is improved with a process which comprises catalytically cracking a gas oil in a first cracking zone, fractionating the resulting products, and then recracking the heavy naphtha fraction obtained from the fractionation in a second cracking zone. Davis discloses that the recracked product has an increased octane number and a reduced level of sulfur.

Hauschildt also teaches a recracking process for improving the quality of a refinery gasoline pool. Hauschildt teaches that a feedstock comprising from 80 to 100 volume percent of a hydrocarbon fraction containing at least 25 weight percent of mono-acromatic hydrocarbons and boiling in the boiling range of heavy gasoline in combination with from 0 to 20 volume percent of a vaporizable hydrocarbon fraction can be catalytically cracked to produce a product having an increased low molecular weight olefin and mono-aromatic content, a substantially reduced sulfur content, and a high octane rating relative to the feedstock. It is disclosed that the fraction comprising from 80 to 100 volume percent of the feedstock is preferably a catalytic cracking product. It is also disclosed that the feedstock must be subjected to catalytic cracking in the absence of any other feedstock and the products must be isolated separately from any other products.

3. Apparatus for Recracking

The Davis and Hauschildt recracking processes could, of course, be carried out in two, separate FCC units arranged in series. Each unit would contain its own riser reactor, disengaging vessel regenerator, etc. However, there are two major drawbacks to the use of separate units. First of all, most oil refineries contain only one FCC unit so that a second unit would have to be built at an enormous cost. Secondly, FCC units operate in a delicate heat balance with coke combustion in the regenerator providing the heat for the cracking reaction. It is known that naphtha recracking produces less coke so that heat would have to be added to the FCC unit by the costly burning of torch oil in the regenerator.

Therefore, it is preferred to retrofit an existing FCC unit with an additional riser reactor in order to obtain a unit suitable for practicing the Davis and Hauschildt processes. A number of FCC designs have been suggested which contain two riser reactors and a common regenerator and which can be made by modifying at least certain FCC units already in operation.

FIG. 1 is a simplified drawing of an FCC apparatus disclosed in Davis as being suitable for practicing the disclosed recracking process. The apparatus comprises two independent riser reactors, one for gas oil cracking and the other for heavy naphtha recracking. Each riser reactor is associated with its own cyclone separation system and the hydrocarbon products flow from each cyclone system to a separate product recovery system to prevent the mixing of products from the two riser reactors.

The cyclone system for the gas oil reactor is located within the disengaging vessel whereas the cyclone system for the heavy naphtha reactor is located outside the vessel. In one embodiment, the heavy naphtha cyclone system is located within its own disengaging vessel; in another embodiment it is not. The Davis apparatus has the advantage that it can be constructed from virtually any existing FCC unit by adding the secondary system.

The Davis apparatus is, however, unsatisfactory in many respects. The embodiment featuring a second disengaging vessel is obviously quite expensive to build. The embodiment omitting the second vessel requires the heavy naphtha cyclones to be built of especially heavy materials to withstand the added pressure differential and also to guard against the possibility of a hole developing which would, of course, require the entire FCC unit to be shut down.

FIG. 2 is a simplified drawing of an FCC apparatus disclosed in Ford, U.S. patent application 139,894, filed Apr. 14, 1980 now U.S. Pat. No. 4,297,203. The Ford application is commonly assigned and is incorporated by reference. The Ford apparatus comprises two independent riser reactors and, associated with each, a cyclone separation system and a product recovery system. Both cyclone separation systems are located within the disengaging vessel. The secondary riser reactor is directly connected to the secondary cyclone separation system. Furthermore, this system is constructed so that the vaporous hydrocarbon products from the secondary riser reactor do not enter the interior of the vessel and mix with the products from the primary riser reactor. Ford discloses that means are provided for commingling the hydrocarbon vapors from the two cyclone separation systems so they can be sent to a single product recovery system if so desired.

One advantage of the Ford FCC apparatus is that virtually any existing unit can be retrofitted to form it. In other words, regardless of the configuration of the primary riser reactor and cyclones, the secondary riser reactor and its directly-connected cyclones can be added and commingling of the products can be eliminated. There are also several advantages which accure from positioning the second cyclone separation system inside the disengaging vessel; namely, the cyclone can be constructed more simply, the cyclone dip-legs can be made vertical to minimize problems of erosion, and the FCC unit can continue operation even if an opening develops in the cyclone or its dip-leg.

Unfortunately, it has been found that catalyst surges, which inevitably occur from time to time during operation of an FCC unit, can cause certain problems in the Ford apparatus. Specifically, a catalyst surge in the secondary riser reactor can disrupt the efficiency of its primary cyclone and catalyst can be spewed out the top where it passes to the product recovery system.

FIG. 3 is a simplified drawing of an FCC apparatus disclosed in Fahrig, U.S. patent application 178,140, filed Aug. 14, 1980 now U.S. Pat. No. 4,310,489. The Fahrig application is commonly assigned and is incorporated by reference. As does the Ford apparatus, the Fahrig apparatus comprises two independent riser reactors, two associated cyclone separation systems located within a common disengaging vessel, and two associated product recovery systems. The Fahrig apparatus further comprises a flow reversal means at the upper end of the secondary riser reactor and an attached downwardly directed flow reversal conduit for directing the flow of cracked hydrocarbon products and entrained cracking catalyst downwardly toward the dense phase. The preferred embodiment of the Fahrig apparatus also comprises such a flow reversal means and conduit associated with the primary riser reactor.

Thus, it can be seen that both riser reactors directly communicate with the dilute phase of the disengaging vessel. Since there are no physical barriers, commingling of the products from the two riser reactors is avoided by controlling the respective pressure differentials between the interiors of the flow reversal conduits and the dilute phase. The control of pressure differential in the Fahrig apparatus does not, however, represent the optimal solution because it does not minimize commingling of the products.

To understand why the Fahrig means of control does not minimize commingling of the products, it is necessary to review certain principles from the study of fluid dynamics. In particular, it is known that the flow rate of a fluid between two points is a function of the pressure differential between the two points multiplied by the cross-sectional area of flow. This relationship is expressed in the following equation:

$$W = f(\Delta P \cdot A)$$

where W is the mass flow rate in units of mass/time, $\Delta P$ is the pressure differential in units of mass/length.time$^2$ (and is converted to units of force/length$^2$ by the gravitational constant), and A is the cross-sectional area of flow in units of length$^2$. Thus, it is known that, for a given area of flow, the flow rate increases as the pressure differential increases.

Applying this to the Fahrig apparatus, it is known that the flow rate of hydrocarbons from the interior of the flow reversal conduit to the dilute phase is a function of the pressure differential between these two points. The relevant area of flow in the Fahrig apparatus is the annular area between the riser reactor and the flow reversal conduit, which is a constant.

Fahrig teaches that it is important that the products from the primary riser reactor do not pass into the secondary cyclone separation system and on to the secondary product recovery system. To achieve this end Fahrig teaches that the pressure differential between the secondary header (whose pressure is equal to the pressure in the interior of the flow reversal conduit minus a small friction loss) and the dilute phase should preferably be maintained at about 500 mm of water. Since the cross-sectional area of flow is relatively large, such a pressure differential is achieved only by a considerable flow of products from the secondary riser reactor to the dilute phase. The products in the dilute phase then leave the disengaging vessel through the primary riser reactor and pass to the primary product recovery system.

In summary, the Fahrig apparatus does not minimize commingling between the products from the two riser reactors. Instead, the apparatus forces some of the products from the secondary reactor to the primary product recovery system in order to ensure that no products from the primary reactor pass directly to the secondary product recovery system. This substantially decreases the yield of products at the secondary product recovery system. On the other hand, the Fahrig apparatus avoids the disadvantages associated with the Davis apparatus since both cyclone systems are located within the common disengaging vessel. And since little of the catalyst enters the cyclone system, even during surges, the Fahrig apparatus avoids the problem of catalyst in the product recovery system during surges which is associated with the Ford apparatus.

SUMMARY OF THE INVENTION

One embodiment of this invention is a process for separately and simultaneously contacting two fluid streams, at least one of which is a hydrocarbon feedstock, with cracking catalyst in two riser reactors. In more detail, the process comprises passing a mixture of cracking catalyst and a first fluid stream upwardly through a primary riser reactor having a downstream end extending into the interior of a disengaging vessel, withdrawing the mixture from the primary riser reactor and passing the first fluid stream and entrained catalyst into an inlet of a primary cyclone separation system located within the disengaging vessel, separating the first fluid stream from the entrained catalyst in the primary cyclone separation system, withdrawing the entrained catalyst from the primary cyclone separation system and passing it to a dense catalyst phase in the disengaging vessel and then to a regenerator, and withdrawing the first fluid stream from the primary cyclone separation system and passing it outside the vessel through a product outlet line.

At the same time the first fluid stream and catalyst are being contacted in the primary riser reactor and then separated in the primary cyclone separation system, a second fluid stream and catalyst are being contacted in a secondary riser reactor and then separated in a secondary cyclone separation system.

The process also comprises separating the dilute phase of the disengaging vessel into two regions. The first region contains the downstream end of the primary riser reactor and the primary cyclone separation system while the second region contains the downstream end of the secondary riser reactor and the secondary cyclone separation system. The process further comprises controlling the direction and volume of flow between the two dilute phase regions at a desired point with a control system. The process requires that at least one of the fluid streams be a hydrocarbon feedstock which passes through its riser reactor under cracking conditions.

The above-described process offers many significant advantages over previous fluid catalytic cracking processes. First of all, the process can be carried out with minimal commingling between the two fluid streams because of the separation of the dilute phase into two regions and because of the control system which controls the direction and volume of flow between the two dilute phase regions. Secondly, because commingling is minimized without the need for a riser-reactor-cycloneseparation-system configuration which prevents vapors from entering the interior of the disengaging vessel, the process can be carried out with intermittent catalyst surges without losing catalyst to the product recovery systems. Thirdly, the process can be carried out without interruption even if holes develop in a cyclone separation system because both cyclone separation systems are located within a common disengaging vessel. Fourthly, the process offers a flexibility in modes of operation not found in previous FCC processes. For example, the following five modes are possible: (1) cracking of similar hydrocarbon feedstocks under similar conditions; (2) cracking of similar hydrocarbon feedstocks under different conditions; (3) cracking dissimilar hydrocarbon feedstocks under different conditions; (4) cracking a hydrocarbon feedstock in one riser reactor while using the second riser reactor to convey hot regenerated catalyst directly to the dense phase of the disengaging vessel; and (5) cracking a hydrocarbon feedstock in one riser reactor while using the second riser reactor to chemically treat the catalyst.

Another embodiment of this invention is an apparatus for the fluidized catalytic cracking of hydrocarbon feedstocks. The apparatus comprises one disengaging vessel, one spent catalyst regenerator, a primary riser reactor, a primary cyclone separation system, a secondary riser reactor, a secondary cyclone separation system, a partition, and a control system. The disengaging vessel has a dense phase and a dilute phase of cracking catalyst and also has means for the introduction of a stripping gas in its lower portion. The regeneration has, in turn, means for the introduction of air in its lower portion.

Each riser reactor has means at its upstream end for the introduction of the catalyst and the fluid stream. Each riser reactor also has a downstream end communicating with the interior of the disengaging vessel. Each cyclone separation system is located within the disengaging vessel and separates the fluid stream from the catalyst. Each cyclone separation system has an inlet, an outlet communicating with the dense phase for discharging the catalyst, and a product outlet line connected to vent the fluid stream outside the disengaging vessel.

The partition is located in the disengaging vessel and it occupies from about 60 to 98 percent of the vertical cross-sectional area of the dilute phase and from about 0 to 95 percent of the vertical cross-sectional area of the dense phase. The partition is positioned to separate the dilute phase into two regions. The first region contains the downstream end of the primary riser reactor and the primary cyclone separation system while the second region contains the downstream end of the secondary riser reactor and the secondary cyclone separation system. The control system controls the direction and volume of flow between the two dilute phase regions at a desired point.

This apparatus offers several advantages over previously described FCC designs. First of all, the apparatus is particularly well-suited for carrying out all the variations of the above-described process. Secondly, since both cyclone separation systems are located within a common disengaging vessel, they operate with a smaller pressure differential between their interiors and exteriors. Consequently, the systems can be constructed with relatively lightweight materials. A further benefit of the interior location is that the formation of a hole in one of the systems does not require the entire FCC unit to be shut down. Thirdly, catalyst surges do not cause catalyst to pass out the product outlet lines since there is no need for a riser-reactor-cyclone-separation-system configuration which prevents vapors from entering the interior of the disengaging vessel. Fourthly, virtually any existing FCC unit containing a single riser reactor can be retrofitted to form it.

DETAILED DESCRIPTION OF THE INVENTION

1. The Process and Apparatus In General

This invention is an improved process and an improved apparatus for the fluidized catalytic cracking of hydrocarbon feedstocks. The process comprises the separate and simultaneous contacting of two fluid streams, at least one of which is a hydrocarbon feedstock, with cracking catalyst in primary and secondary riser reactors. The apparatus comprises primary and secondary riser reactors and associated cyclone separation systems.

Figure 1:
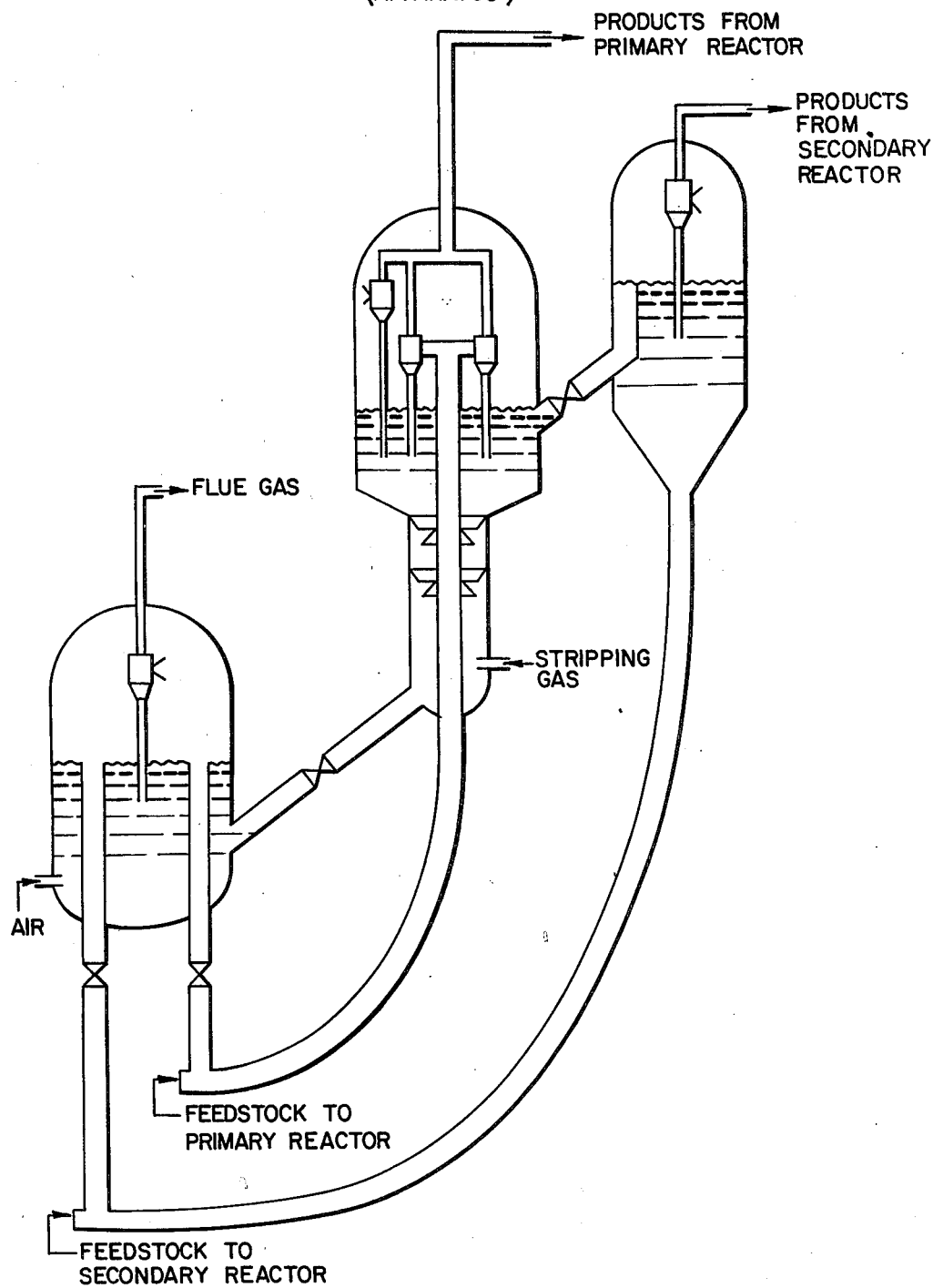
FIG. 1 is an elevational view of an FCC unit disclosed in Davis, U.S. Pat. No. 3,928,172.
Figure 2:
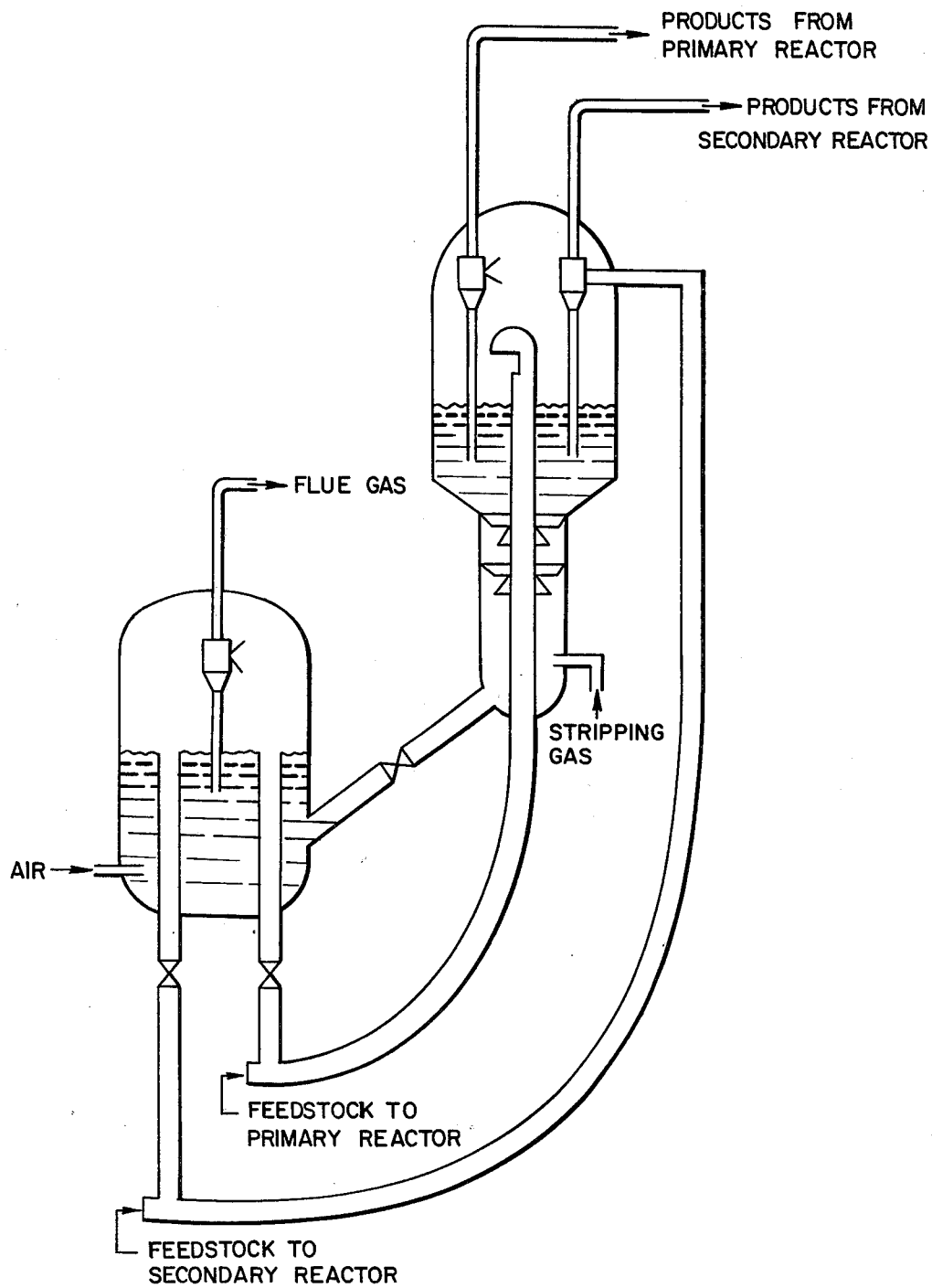
FIG. 2 is an elevational view of an FCC unit disclosed in Ford, U.S. patent application 139,894.
Figure 3:
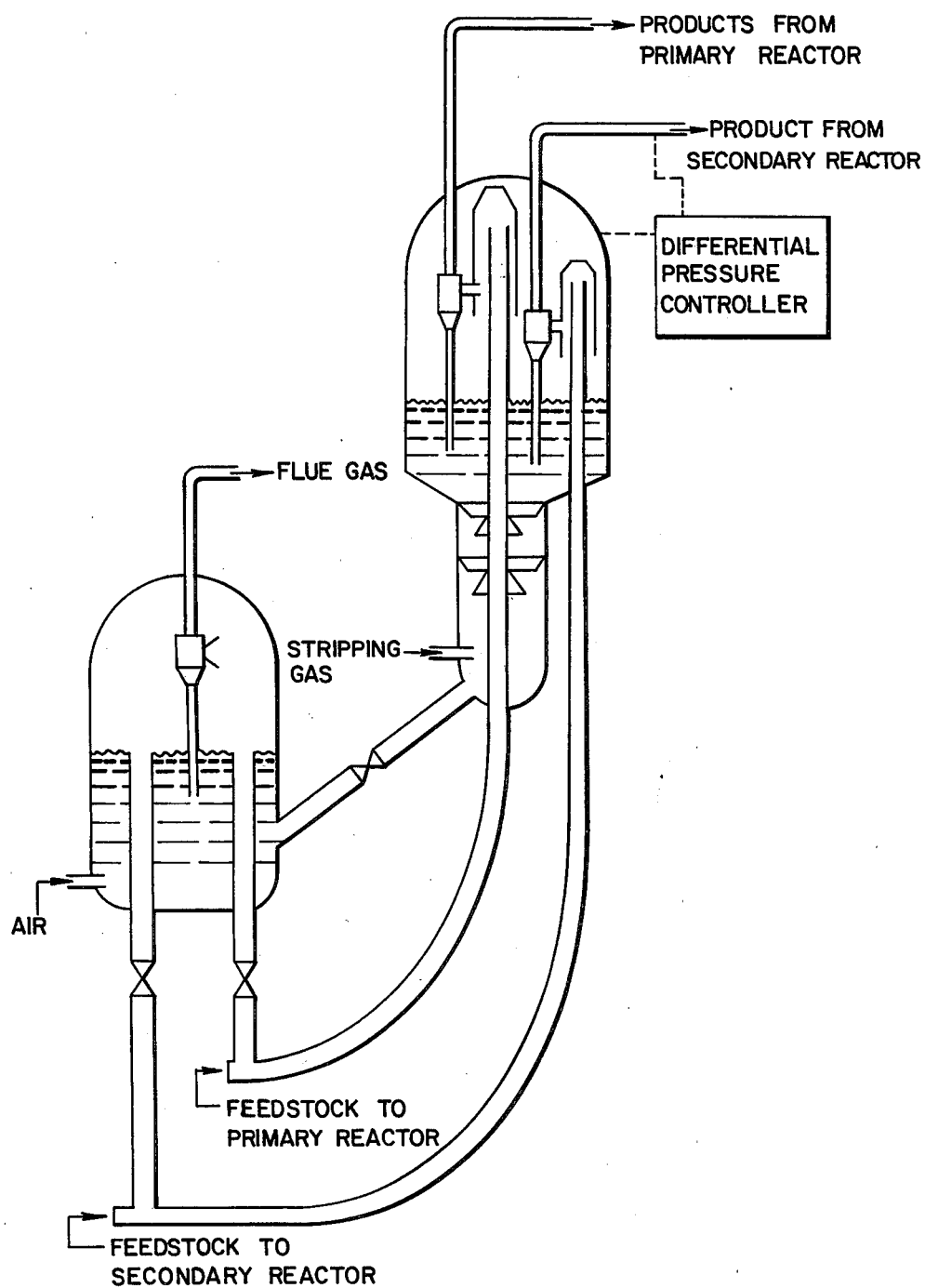
FIG. 3 is an elevational view of an FCC unit disclosed in Fahrig U.S. patent application 178,140.
Figure 4:
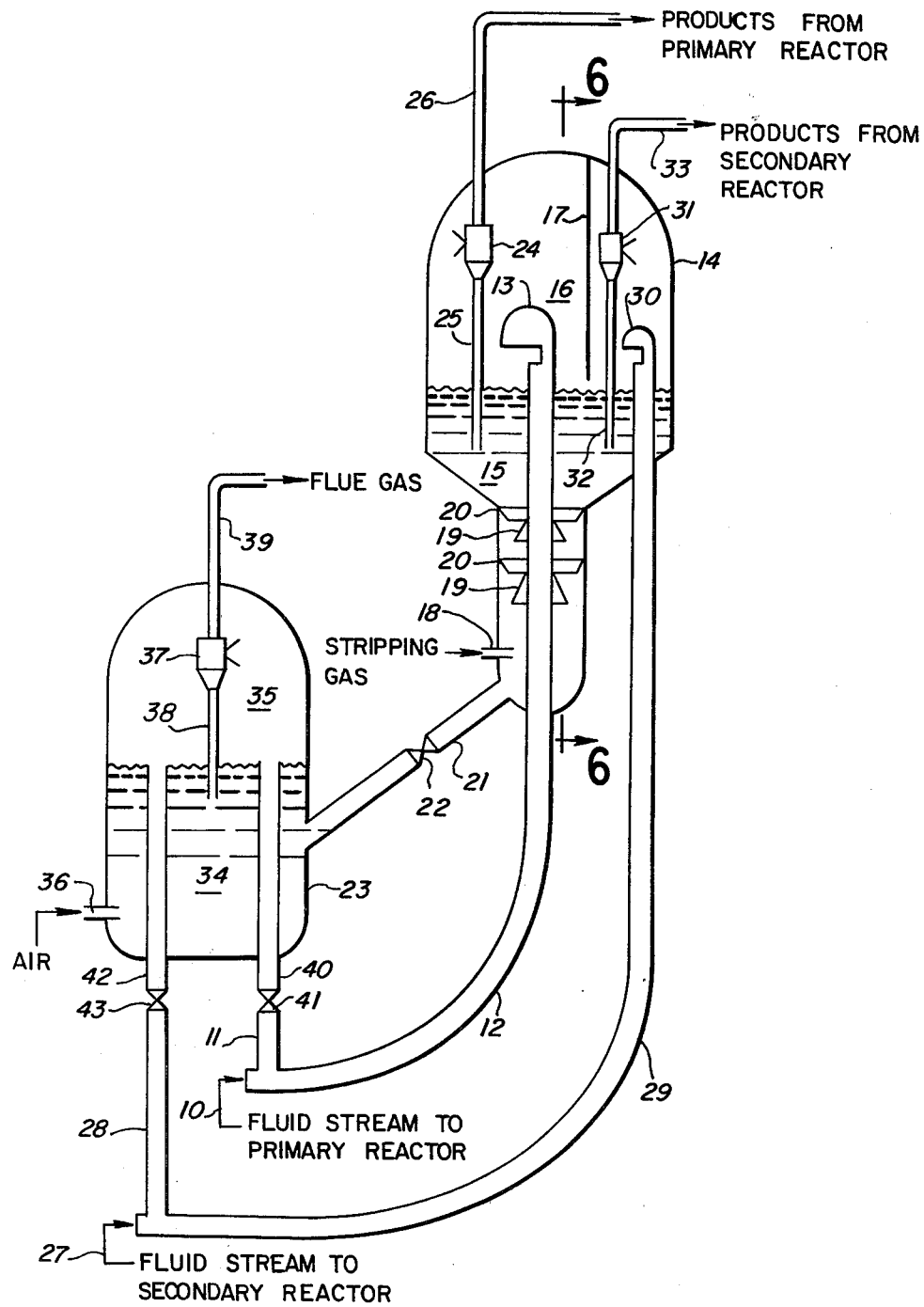
FIG. 4 is an elevational view of an FCC unit incorporating an embodiment of this invention.

The invention can best be understood by reference to the drawings. FIG. 4 illustrates one embodiment of this invention. A first fluid stream, which may or may not be a hydrocarbon feedstock, from line 10 is contacted with hot, regenerated cracking catalyst from line 11 at the upstream end of the vertically ascending primary riser reactor 12. The fluid stream and catalyst pass up the riser reactor to the downstream end 13 which is located within the disengaging vessel 14. In FIG. 4, the primary riser reactor is shown terminating in a downwardly directed discharge head, however, the exact configuration of the downstream end of the primary riser reactor is not critical to this invention. For example, configurations featuring flow reversal caps and/or direct connections to the cyclone separation system are also suitable.

The cracking catalyst which are suitable in this invention include high-activity solids having a size not greater than about 100 microns. Preferably, the major proportion of cracking catalyst is in the size range of about 40 to 80 microns. Suitable catalysts include those of the amorphous type such as silica, alumina, magnesia, boria, and mixtures thereof. The preferred catalysts include those comprising a molecular sieve component such as crystalline aluminosilicates or crystalline borosilicates.

The fluid streams which are suitable in this invention include liquids and gases which may or may not include entrained or dispersed solids. Hydrocarbon feedstocks are especially useful fluid streams. The term "hydrocarbon feedstock" is intended to include petroleum fractions such as naphthas, distillates, gas oils, and residual oils; shale oils; oils from tar sands; oils from coal liquefaction; and the like.

When a hydrocarbon feedstock is used as the fluid stream, the feedstock and the cracking catalyst preferably pass up the riser reactor at cracking conditions, i.e., at a temperature of about 800° to 1100° F.; at a weight-hourly space velocity of about 2 to 200; at a catalyst-to-hydrocarbon weight ratio of about 2 to 20 so that the fluidized dispersion has a density of about 1 to 40 lbs./ft.$^3$; and a fluidizing velocity of about 10 to 150 ft/sec. Under these conditions the conversion level varies from about 40 to 100 percent where conversion is defined as the percentage reduction of hydrocarbons boiling above 430° F.

Returning to FIG. 4, the disengaging vessel 14 is made up of an upper, larger-diameter portion; a lower, smaller-diameter portion commonly called "the stripper"; and a transition portion in between. The vessel contains a dense catalyst phase 15 having a density up to about 25 to 50 lbs./ft$^3$ and a dilute catalyst phase 16 having a density less than about 2 lbs./ft$^3$ As used here, the term "dense phase" includes the catalyst in the stripper portion of the disengaging vessel. While the upper surface of the dense phase can be raised or lowered as desired, it is generally maintained at a level above the stripper portion and yet below the discharge head of the primary riser reactor so as to allow the fluid stream to disengage from the catalyst particles without substantial contact with the dense phase.

Located within the disengaging vessel is the partition 17, which may be solid or may contain one or more openings. The partition occupies from about 60 to 98 percent, preferably about 75 to 95 percent, of the vertical cross-sectional area of the dilute phase. The partition also occupies from about 0 to 95 percent, preferably about 0 to 20 percent, of the vertical cross-sectional area of the dense phase. The percentages can be varied during operation by raising or lowering the level of the dense phase. For maximum flexibility of operation, it is generally desirable that the partition extend downward to a level where the dense bed can be maintained either above or below the bottom of the partition. Since the dense bed is preferably maintained above the stripper and below the discharge head of the primary riser reactor, it follows that the partition preferably extends downward to a level above the stripper and yet below the discharge head of the primary riser reactor.

The partition is further positioned to separate the dilute phase into two regions; the first region containing the downstream end of the primary riser reactor and the primary cyclone separation system, the second region containing the downstream end of the secondary riser reactor and the secondary cyclone separation system. The partition is generally constructed of relatively light gauge steel plate since, during operation, there is a relatively small pressure differential across it. The partition is preferably reinforced against lateral movement by rods positioned between the partition and the disengaging vessel. The function of the partition is described below.

The stripper portion of the disengaging vessel derives its name because it contains a conduit 18 for the introduction of an inert stripping gas, such as steam, into the vessel. The stripper portion includes steam-catalyst contacting devices such as a plurality of frustoconical baffles 19 attached to the primary riser reactor and interspersed frustoconical baffles 20 attached to the side wall of the vessel. The lower portion of the vessel also contains a conduit 21 for transferring spent catalyst at a rate controlled by valve 22 to the regenerator 23. The position of valve 22 is commonly used to adjust the dense phase level in the disengaging vessel.

The fluid stream and entrained catalyst particles pass upward through the dilute phase and enter a first-stage cyclone separator 24. The entrained catalyst particles are separated in the cyclone and are discharged downwardly through dip-leg 25 and into the dense phase. The fluid stream passes from the cyclone through product outlet line 26 to a product recovery system (not shown). The product recovery system generally comprises a fractionator, a variable rate gas compressor, and storage facilities. In FIG. 4, the primary cyclone separation system is shown as consisting of one first-stage cyclone. This is for convenience only; in practice, there are a plurality of first-stage cyclones and a plurality of second-stage cyclones.

As the first fluid stream is contacted with cracking catalyst in the primary riser reactor, a second fluid stream from line 27 is simultaneously contacted with hot regenerated catalyst from line 28 at the upstream end of the vertically ascending secondary riser reactor 29. The second fluid stream may or may not be a hydrocarbon feedstock. However, at least one of the fluid streams is a hydrocarbon feedstock. The secondary riser reactor is shown terminating in a downwardly directed discharge head 30 located within the disengaging vessel. As with the primary riser reactor, the exact configuration of the discharge head is not critical to the invention. The secondary riser reactor has associated with it a cyclone separation system which consists of a first-stage cyclone 31, a dip-leg 32, and a product outlet line 33. As before, the cyclone separation system is shown as consisting of one first-stage cyclone for convenience only. The fluid stream passes on to a product recovery system (not shown).

Spent catalyst leaves the disengaging vessel through line 21 and enters the regenerator 23. The regenerator contains a dense catalyst phase 34 and a dilute catalyst phase 35. The catalyst in the dense phase is fluidized by the combustion air from line 36 whereupon the coke deposits on the spent catalyst are burned and the catalytic activity of the spent catalyst is restored. The combustion, or flue, gases continuously pass upwardly from the dense phase into the dilute phase. These combustion gases, together with entrained catalyst particles, then enter the cyclone separator 37. The entrained catatlyst particles are discharged downwardly through dip-leg 38 while the combustion gases exit the regenerator through line 39. The effluent combustion gases can be discharged directly to the atmosphere or, alternatively, can be passed through conventional particulate control equipment and/or conventional heat exchange means prior to such discharge into the atmosphere.

Regenerated catalyst having a low content of residual coke is withdrawn from the regenerator through standpipe 40 at a rate controlled by valve 41 to supply hot regenerated catalyst to line 11 which is described above. Similarly, regenerated catalyst having a low content of residual coke is withdrawn from the regenerator through standpipe 42 at a rate controlled by valve 43 to supply hot regenerated catalyst to line 27 which is described above.

Figure 5:
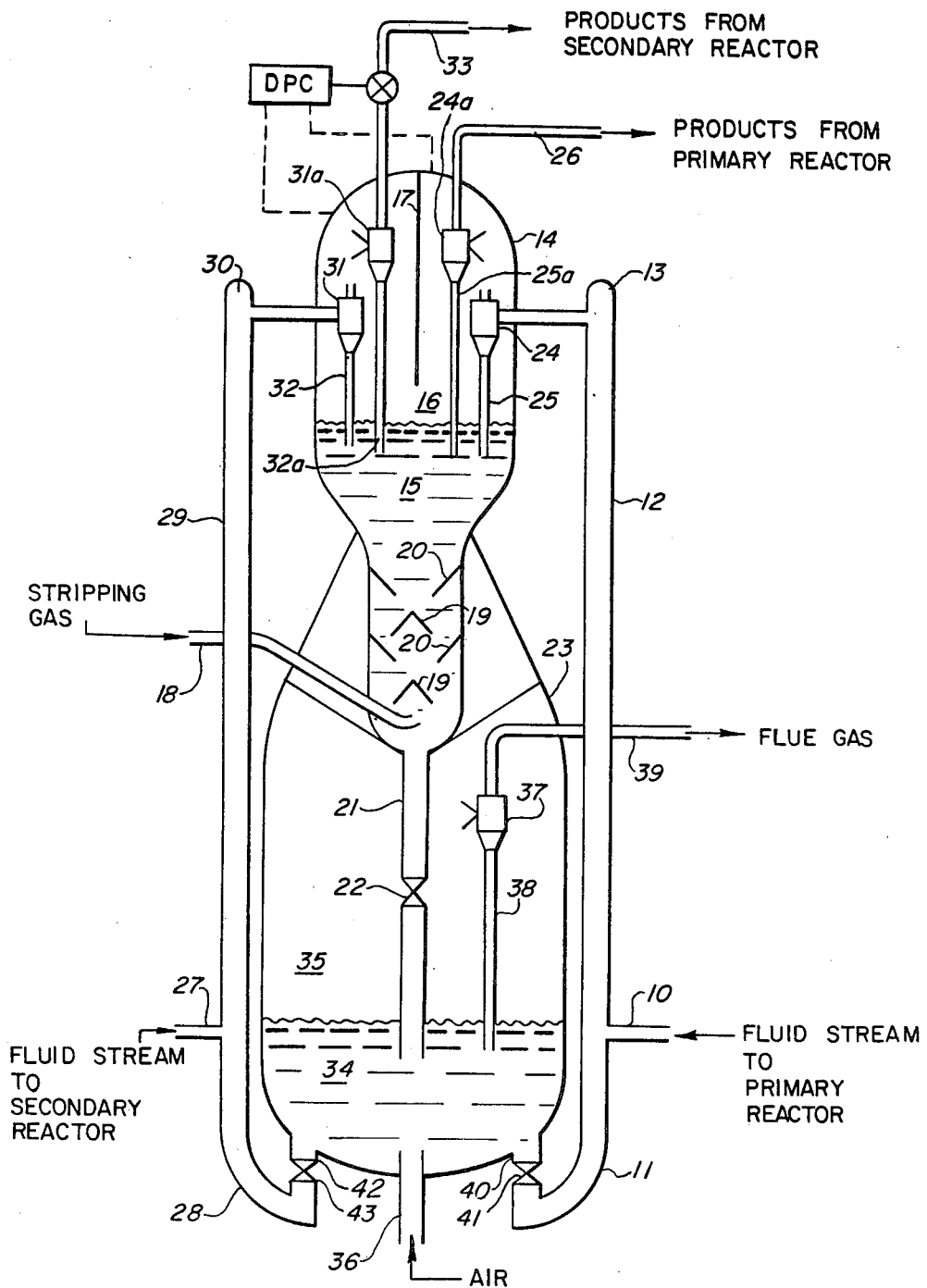
FIG. 5 is an elevational view of a second FCC unit incorporating an embodiment of this invention.

FIG. 5 illustrates a second embodiment of the apparatus of this invention. This shows how virtually any existing FCC unit can be retrofitted to provide the apparatus of this invention. The apparatus of FIG. 5 is similar in operation to the apparatus of FIG. 4 except that each cyclone system further comprises a second-stage cyclone 24a, 25a, 31a, and 32a and the riser reactors are directly connected to the first-stage cyclones.

Now shown in FIG. 4, but critical to this invention, is a control system in which a controlled variable is measured and the result of this measurement is used by a controller, automatic or manual, to manipulate one of the process variables. If the controller is automatic, the control system is commonly known as a "closed-loop" system and if the controller is manual, the system is commonly known as an "open-loop" system. In this invention, the control system controls the direction and volume of vapor flow between the two dilute phase regions defined by the partition at a desired point. The control system is especially critical when the apparatus is operated in a mode in which commingling of the products from the two reactors is to be minimized.

One form of control system responsive to differential pressure within the two dilute phase regions of the vessel 14 is indicated by the box labeled DPC for differential pressure controller which controls a valve for adjusting the relative flow in line 33. The broken lines indicate means for transmitting pressure signals from the two regions to the DPC. A similar system is shown and described in the Fahrig U.S. Pat. No. 4,310,489 which has been incorporated herein by reference.

Also critical to minimizing the commingling of the two products are the partition and the stripping gas introduction means. The partition minimizes commingling by serving as a partial physical barrier between the two products. The efficiency of the barrier depends on the amount of open space between the two dilute phase regions and also on the depth, if any, to which the partition extends into the dense phase. The stripping gas also serves to minimize the commingling of the products, even though its primary function is to remove entrained hydrocarbons from the catalyst. This added function is served because the stripping gas flows preferentially to the dilute phase region having the lower pressure and thus reduces the pressure differential, and the flow, between the two regions.

There are various types of controlled variables which can be used in the control system of this invention. Three of the suitable types are: (1) a suitable product quality parameter, (2) the pressure differential between the two dilute phase regions, and (3) the position of a swing plate attached to the partition. The preferred type of controlled variable is the pressure differential. It is recognized that one type of controlled variable can be used as the primary controlled variable with another type being used as a supplement or back-up. Each of these three types is discussed in turn.

2. Product Quality Parameter as Controlled Variable

When the apparatus of this invention is operated in a mode in which commingling of the products from the two reactors is to be minimized, it follows that the two products are different. The difference in products can be measured with many different parameters such as boiling point distribution, octane number, etc. However, for use as a controlled variable, the parameter must be capable of being quickly and accurately measured. Suitable parameters are the refractive index, hydrogen gas concentration, hydrogen sulfide gas concentration, etc. The preferred parameter for use as the controlled variable is the refractive index. Therefore, a preferred embodiment of the control system comprises a refractive index sensor in each of the two product outlet lines.

It can be seen that the differential between the refractive indices of the two products is maximized when commingling of the products is totally eliminated. Therefore, the controller is designed to maximize the differential by manipulating one of the process variables. The controller is preferably automatic.

Suitable process variables are those which affect the pressure in the two dilute phase regions in the disengaging vessel. Examples of such variables are the gas compressor rates, hydrocarbon feedstock flow rate to the riser reactors, and the position of various downstream valves. The preferred controlled variable is the gas compressor rate in one of the two product recovery systems. As an example, assume that the controlled variable is the gas compressor rate in the secondary product recovery system. Then, if the pressure in the secondary dilute phase region becomes greater than the pressure in the primary dilute phase region and commingling of the products begins, the gas compressor rate is increased by the controller to bring the two regions into pressure balance. The control system can also contain an override feature so that if the secondary gas compressor rate cannot be set high enough to balance the pressures, the primary gas compressor rate can be decreased.

Figure 6:
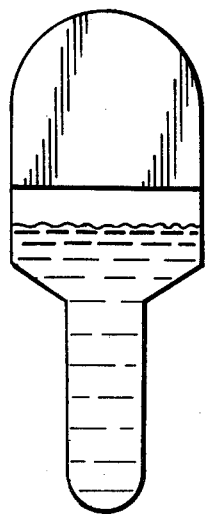
FIGS. 6 and 7 are sectional views of the disengaging vessel. They show alternate configurations of the type of partition which is suitable for use when the flow between the two dilute phase regions is controlled by measuring product quality parameters.
Figure 7:
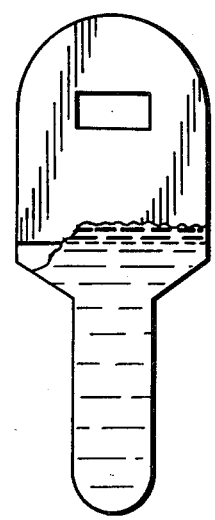

As explained above, the partition occupies from about 60 to 98 percent, preferably about 75 to 95 percent, of the vertical cross-sectional area of the dilute phase and from about 0 to 95 percent, preferably about 0 to 20 percent, of the vertical cross-sectional area of the dense phase. The partition cannot occupy all the cross-sectional area because any significant pressure imbalance disrupts the operation of the common regenerator. It is preferred that any openings in the partition be limited in number and relatively large in size since small holes have a tendency to plug. FIGS. 6 and 7 are sectional views of the disengaging vessel and show two suitable configurations of the partition. In FIG. 6, the partition does not extend into the dense phase. In FIG. 7, it does so extend and it further contains a window opening.

3. Pressure Differential as Controlled Variable

Since commingling of the products is minimized when the pressure differential between the two dilute phase regions is minimized, another embodiment of this invention uses a control system in which the pressure differential is the controlled variable. Thus, a preferred embodiment of the control system comprises a pressure sensor in each dilute phase. The control system also comprises a controller, which is preferably automatic, and a process variable, which is preferably the gas compressor rate in one of the two product recovery systems.

It will be recalled that the flow rate of hydrocarbon products between the two regions is a function of the pressure differential between the regions multiplied by the area of flow. If the area is fixed at a relatively large size, the pressure differential is too small to be accurately measured unless the gas flow rate is large. But if the cross-sectional area is fixed at a relatively small size, excessive pressure differentials and/or plugging can occur. Therefore, to use pressure differential as the controlled variable, it is necessary to adapt the partition so that the cross-sectional area for flow between the two regions is variable.

Figure 8:
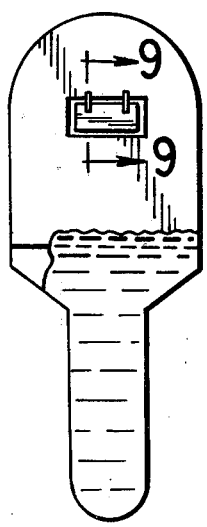
FIG. 8 is another sectional view of the disengaging vessel. It shows the type of partition which is suitable for use when the flow between the two dilute phase regions is controlled by measuring pressure differential or swing state position.
Figure 9:
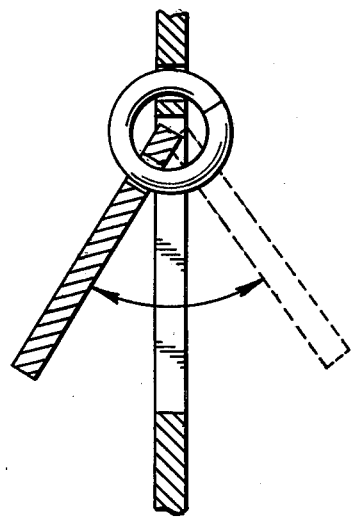
FIG. 9 is a detailed sectional view of FIG. 8.

One method of adaptation is to attach a swing plate to a partition containing a window, as shown in FIG. 8 and in the sectional detail in FIG. 9. The swing plate can be suspended by rings, as shown, or by hinges or other suitable means. The plate is sized to provide sufficient clearance between it and the partition on all sides to ensure that plugging does not occur. The clearance is generally about 1 inch or more. The free movement of the swing plate can be further ensured by the use of a steam purge at the means of suspension. The free movement of the plate can be dampened by suitable means, for example, by construction with a heavier gauge metal or by adding weights to the plate.

The swing plate responds to an increase in pressure differential by moving so that the cross-sectional area of flow is increased. In this way, the pressure differential is moderated but also kept at a measurable level unless there is essentially no flow between the two regions, a condition which is unlikely to occur for any significant period of time in a commercial unit.

4. Swing Plate Position as Controlled Variable

Another embodiment of this invention includes a partition containing at least one window opening and an attached swing plate in each window. The window opening and swing plate are as described above. In this embodiment, however, it is the position of the swing plate which is measured rather than the pressure differential between the two dilute phase regions. It can be seen that commingling of the products from the two riser reactors is minimized when the swing plate is in the vertical position.

The position of the swing plate is measured by a means suitable for use with an FCC unit. Suitable means include, for example, a source of electromagnetic radiation directed at the swing plate and a sensor of the radiation positioned so that the amount of radiation to the sensor is related to the position of the swing plate. Another means of measuring the swing plate position is to attach a spring comprising a suitable metal alloy to the swing plate in such a way that it expands or contracts with the movement of the swing plate. Suitable metal alloys are those which exhibit a change in an electrical property, for example, conductivity, when subjected to a stress. Such a change can be measured and related to the swing plate position.

5 Modes of Operation

By the appropriate piping of the feed and product lines, this apparatus offers a flexibility not available in previous designs. There are many modes of operation, including the following five.

In one mode, similar hydrocarbon feedstocks are cracked in the two riser reactors under similar conditions and the products commingled. Commingling of the products is also advantageously practiced whenever one of the systems downstream of the riser reactors is inoperative, for example, due to repairs.

In a second mode, similar hydrocarbon feedstocks are cracked in the two riser reactors under different conditions and the products kept separate. For example, if a conventional gas oil boiling in the range of about 650° to 1000° F. is the feedstock to both riser reactors, one riser reactor can be used to produce high olefin yields by cracking the gas oil at high temperatures and high space velocities while the other riser reactor can be operated at lower temperatures and lower space velocities to produce lower olefin yields, larger amounts of isobutane for use in alkylation processes, and larger amounts of light gas oil for use in distillate fuels.

The third, and preferred, mode is to crack dissimilar hydrocarbon feedstocks in the two riser reactors under different conditions and keep the products separate. For example, one hydrocarbon feedstock can be a conventional gas oil while the other hydrocarbon feedstock can comprise a residual oil boiling above 1000° F. The feedstock to the one riser reactor can also comprise a portion of the products from the other riser reactor. In this mode of operation, the Davis and Hauschildt processes, which are especially preferred, can be carried out.

In a fourth mode of operation, one of the riser reactors, for example, the primary, is used to catalytically crack a hydrocarbon feedstock while the other riser reactor, here the secondary, is used to enhance the operation of the primary system by improving the removal of hydrocarbons in the stripper. In particular, a fluid stream such as steam can be used to convey hot regenerated catalyst through the secondary riser reactor and then back to the dense phase in the disengaging vessel. This catalyst thus returns to the dense phase at about the temperature at which it left the regenerator, which is generally about 1200° to 1500° F. This temperature is well above the temperature of the catalyst returning to the dense phase from the primary reactor, which is generally about 800° to 1100° F.

Because of the mixing of the catalyst from the two sources, the stripper operates at a temperature higher than normal and greater amounts of the deposited heavy, highly-aromatic hydrocarbons which comprise the coke on the catalyst are cracked and stripped off. The net result is that the yield of products in the primary product recovery system is increased and the carbon concentration on the spent catalyst to the regenerator is decreased. The decrease in carbon concentration reduces the heat load in the regenerator and permits the processing of heavier feedstocks such as residuals which inherently produce more coke than conventional gas oils.

The fifth mode of operation resembles the fourth mode in that one of the riser reactors, for example, the primary, is used to catalytically crack a hydrocarbon feedstock while the secondary riser reactor is used to enhance the operation of the primary system. The enhancement occurs here by chemically treating the cracking catalyst in the secondary riser reactor to somehow improve the properties of the cracking catalyst. For example, one use of a chemical agent is to improve the activity of the catalyst. The preferred use of a chemical agent is to reduce the deleterious effects of contaminant metals deposited on the surface of the catalyst.

It is well known that contaminant metals such as nickel, vanadium, copper, and iron are present in hydrocarbon feedstocks and deposit on the surface of the cracking catalyst during the FCC process. These metals adversely affect the selectivity of the catalyst. In addition, the metals are themselves hydrogenation-dehydrogenation catalysts and increase the amounts of hydrogen gas and coke which are formed. One way of reducing the deleterious effects of these metals is to passivate them by contacting the catalyst with a suitable passivating agent. It is believed that the passivating agent combines with the metals, either physically or chemically, to render them less deleterious.

A large number of passivating agents have been disclosed, for example, antimony, bismuth, tellurium, thallium, tungsten, manganese, and reducing gases such as hydrogen, hydrogen sulfide, and carbon monoxide. Unfortunately, many of these passivating agents, e.g., antimony compounds, are very hazardous. When added to an FCC unit, some of the compound inevitably falls to deposit on the catalyst and is instead vented to the atmosphere as part of the regenerator flue gas or becomes part of the hydrocarbon products. Because of the nature and size of the flue gas and product streams, it is impractical to treat them to remove the trace amounts of the hazardous passivating agent.

In contrast, such hazardous passivating agents are advantageously added to the cracking catalyst in this invention. The addition is made in the secondary riser reactor in which the catalyst is carried by a fluid stream such as steam. Any passivating compound which is not deposited on the catalyst can be removed in a suitable dedicated waste control system connected to the relatively small and easily treated fluid stream of the secondary riser reactor. In this way, the added compounds contaminate neither the hydrocarbon products nor the atmosphere.

I claim:

1. An apparatus for the fluidized catalytic cracking of hydrocarbon feedstocks, the apparatus comprising:
   (a) one disengaging vessel having a dense phase and a dilute phase of cracking catalyst, the vessel further having means for the introduction of a stripping gas in its lower portion;
   (b) one spent catalyst regenerator having means for the introduction of air in its lower portion;
   (c) a primary riser reactor having means as its upstream end for the introduction of the catalyst and a fluid stream, the riser reactor further having a downstream end communicating with the interior of the vessel;
   (d) a primary cyclone separation system for separating the fluid stream from the catalyst, the system located within the vessel and having: (i) an inlet; (ii) an outlet communicating with the dense phase for discharging the catalyst; and (iii) a product outlet line connected to vent the fluid stream outside the vessel;
   (e) a secondary riser reactor having means at its upstream end for the introduction of the catalyst and a fluid stream, the riser reactor further having a downstream end communicating with the interior of the vessel;
   (f) a secondary cyclone separation system for separating the fluid stream from the catalyst, the system located within the vessel and having: (i) an inlet; (ii) an outlet communicating with the dense phase for discharging the catalyst; and (iii) a product outlet line connected to vent the fluid stream outside the vessel;
   (g) a partition extending downwardly from the top of the disengaging vessel occupying from about 60 to 98 percent of the vertical cross-sectional area of the dilute phase and from about 0 to 95 percent of the vertical cross-sectional area of the dense phase, the partition being so positioned as to separate the dilute phase into two regions, the first region containing the downstream end of the primary riser reactor and the primary cyclone separation system, the second region containing the downstream end of the secondary riser reactor and the secondary cyclone separation system;
   (h) a control system for controlling the relative volume of flow from each of the two dilute phase regions; and
   (i) means for transmitting pressure signals from said two regions to said control system.

2. The apparatus of claim 1 further comprising a primary product recovery system communicating with the product outline of the primary cyclone separation system, and a secondary product recovery system communicating with the product outlet line of the secondary cyclone separation system.

3. The apparatus of claim 2 wherein the partition extends into the dense phase and comprises one or more window openings which occupy less than about 98 percent and more than about 60 percent of the vertical cross-sectional area of the dilute phase.

4. The apparatus of claim 3 wherein a swing plate is positioned in each of one or more window openings of the partition.

5. The apparatus of claim 4 wherein the control system comprises a pressure sensor in each dilute phase region, each sensor being connected to the control system.

* * * * *